(12) United States Patent
Zaffetti (10) Patent No.: US 10,288,110 B2
(45) Date of Patent: May 14, 2019

(54) WASHER FOR RETAINING ASSEMBLY PIN

(71) Applicant: Hamilton Sundstrand Space Systems International, Inc., Windsor Locks, CT (US)

(72) Inventor: Mark A. Zaffetti, Suffield, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 666 days.

(21) Appl. No.: 14/717,583

(22) Filed: May 20, 2015

(65) Prior Publication Data

US 2016/0341237 A1   Nov. 24, 2016

(51) Int. Cl.
*F16B 43/00* (2006.01)
*F16B 41/00* (2006.01)

(52) U.S. Cl.
CPC ............ *F16B 43/00* (2013.01); *F16B 41/002* (2013.01); *Y10T 403/75* (2015.01)

(58) Field of Classification Search
CPC ......... Y10T 403/1616; Y10T 403/1624; Y10T 403/4685; Y10T 403/75; F16B 43/00; F16B 43/02; F16B 41/002
USPC ...... 403/13, 14, 260, 408.1; 29/428, 525.01; 411/999
See application file for complete search history.

(56) References Cited

U.S. PATENT DOCUMENTS

| | | | |
|---|---|---|---|
| 2,282,360 A | 5/1942 | Horrocks | |
| 3,611,864 A | 10/1971 | Buckley | |
| 4,096,957 A * | 6/1978 | Iverson | E02F 3/3604 403/154 |
| 4,716,848 A | 1/1988 | Smith et al. | |
| 5,009,017 A | 4/1991 | Diekevers et al. | |
| 5,407,310 A * | 4/1995 | Kassouni | B29C 70/76 29/525.02 |
| 5,577,858 A | 11/1996 | Kasim et al. | |
| 5,630,673 A | 5/1997 | Krzywanos et al. | |
| 5,791,809 A | 8/1998 | Bessey | |
| 6,052,274 A | 4/2000 | Remsburg | |
| 6,073,792 A * | 6/2000 | Campbell | B65D 50/067 220/210 |

(Continued)

FOREIGN PATENT DOCUMENTS

| | | | | |
|---|---|---|---|---|
| DE | 10311841 A1 * | 8/2004 | ................ | F16B 5/02 |
| FR | 3034476 A1 * | 10/2016 | ................ | F16B 5/02 |

*Primary Examiner* — Josh Skroupa
*Assistant Examiner* — Cory B Siegert
(74) *Attorney, Agent, or Firm* — Cantor Colburn LLP (57) ABSTRACT

An assembly includes a first structure having a first pin aperture and at least one first fastener aperture adjacent the first pin aperture and a second structure to attached to the first structure having a second pin aperture and at least one second fastener aperture adjacent the second pin aperture. At least one fastener is configured to pass through the first and second fastener apertures and attach the first structure to the second structure. An assembly pin passes through the first and second pin apertures and is trapped within the first and second pin apertures. A pin-securing washer having a fastener surface defining at least one fastener aperture and a pin-securing surface to secure the assembly pin within the pin apertures. The at least one fastener passes through the at least one fastener aperture of the pin-securing washer.

12 Claims, 6 Drawing Sheets

(56) References Cited

U.S. PATENT DOCUMENTS

| | | | | |
|---|---|---|---|---|
| 6,273,632 B1* | 8/2001 | Takahashi | ............... | F16C 11/02 |
| | | | | 403/14 |
| 8,511,034 B2* | 8/2013 | Gregg | ................... | B60N 2/015 |
| | | | | 248/429 |
| 8,579,569 B2 | 11/2013 | Schendenl | | |
| 8,721,256 B2* | 5/2014 | Servant | ................ | F01D 25/162 |
| | | | | 411/398 |
| 2006/0088398 A1 | 4/2006 | Lund | | |
| 2013/0011253 A1* | 1/2013 | Mulcaire | ............... | F01D 25/243 |
| | | | | 415/214.1 |

* cited by examiner

WASHER FOR RETAINING ASSEMBLY PIN

STATEMENT REGARDING FEDERALLY SPONSORED RESEARCH OR DEVELOPMENT

This invention was made with government support under Contract No. 970634 awarded by National Aeronautics and Space Administration. The government has certain rights in the invention.

BACKGROUND

The subject matter disclosed herein generally relates to assembly pins and, more particularly, to washers for retaining assembly pins.

Assembly pins may be used in assemblies to prevent bolts or other elements from breaking or being damaged when used in joints, couplings, or other connections. For example, when two elements are to be connected, bolts or other fasteners may be configured to support or hold a pre-load, but once the connection is completed, an assembly pin may be provide to bear most of the load in supporting the joint or connection. This is configuration is traditionally used for shear loads, and the assembly pin may be a shear pin.

In such uses, the pins are to be secured, trapped, or locked within or at the joint/connection to prevent working out. Securing, trapping, or locking the pins in place may be carried out in a variety of ways including using cotter pins, staking, friction rings, clips, lock washers, or adding additional parts to the assembly to trap or secure the pin after installation.

SUMMARY

According to one embodiment an assembly includes a first structure having a first pin aperture and at least one first fastener aperture adjacent the first pin aperture and a second structure having a second pin aperture and at least one second fastener aperture adjacent the second pin aperture, the second structure configured to be attached to the first structure with the first pin aperture aligned with the second pin aperture and the first fastener aperture aligned with the second fastener aperture. At least one fastener is configured to pass through the first and second fastener apertures and attach the first structure to the second structure. An assembly pin is configured to pass through the first and second pin apertures, the assembly pin configured to be trapped within the first and second pin apertures such that the assembly pin is configured to bear a shear load. A pin-securing washer having a first surface defining at least one fastener aperture, the first surface configured to distribute a load of a fastener that passes through the at least one fastener aperture and a second surface configured to secure the assembly pin within the first and second pin apertures. The at least one fastener passes through the at least one fastener aperture of the pin-securing washer.

In addition to one or more of the features described above, or as an alternative, further embodiments may include that the first structure is an I-beam and the second structure is a link.

In addition to one or more of the features described above, or as an alternative, further embodiments may include that the first surface includes a first portion defining a first fastener aperture and a second portion defining a second fastener aperture and the second surface extends between the first portion and the second portion.

In addition to one or more of the features described above, or as an alternative, further embodiments may include that the at least one fastener includes a first fastener configured to pass through the first fastener aperture and a second fastener configured to pass through the second fastener aperture.

In addition to one or more of the features described above, or as an alternative, further embodiments may include that the first surface includes a first portion defining a first fastener aperture, a second portion defining a second fastener aperture, and a third portion defining a third fastener aperture, and the second surface extends between the first portion, the second portion, and the third portion.

In addition to one or more of the features described above, or as an alternative, further embodiments may include that the first fastener aperture, the second fastener aperture, and the third fastener aperture are linearly arranged.

In addition to one or more of the features described above, or as an alternative, further embodiments may include that the first fastener aperture, the second fastener aperture, and the third fastener aperture are configured in a triangular configuration.

In addition to one or more of the features described above, or as an alternative, further embodiments may include that the pin-securing washer is a first pin-securing washer that is installed on a first side of the assembly pin, the assembly further comprising a second pin-securing washer configured to be installed on a second side of the assembly pin.

According to another embodiment, a method of securing a first structure to a second structure is provided. The method includes providing a first structure having a first pin aperture and at least one first fastener aperture adjacent the first pin aperture; providing a second structure having a second pin aperture and at least one second fastener aperture adjacent the second pin aperture, the second structure configured to be attached to the first structure with the first pin aperture aligned with the second pin aperture and the first fastener aperture aligned with the second fastener aperture; inserting an assembly pin through the first and second pin apertures, the assembly pin configured to be trapped within the first and second pin apertures such that the assembly pin is configured to bear a shear load; providing at least one fastener configured to pass through the first and second fastener apertures and attach the first structure to the second structure; and securing the assembly pin in the first and second pin apertures with a pin-securing washer, the pin-securing washer having a first surface defining at least one washer-fastener aperture through which the at least one fastener passes, the first surface configured to distribute a load of the at least one fastener, and a second surface configured to secure the assembly pin within the first and second pin apertures.

In addition to one or more of the features described above, or as an alternative, further embodiments may include that the first structure is an I-beam and the second structure is a link.

In addition to one or more of the features described above, or as an alternative, further embodiments may include that the first surface includes a first portion defining a first washer-fastener aperture in the pin-securing washer and a second portion defining a second washer-fastener aperture in the pin-securing washer and the second surface extends between the first portion and the second portion to secure the assembly pin in the first and second pin apertures.

In addition to one or more of the features described above, or as an alternative, further embodiments may include that the at least one fastener includes a first fastener configured to pass through the first washer-fastener aperture and a second fastener configured to pass through the second washer-fastener aperture.

In addition to one or more of the features described above, or as an alternative, further embodiments may include that the first surface includes a first portion defining a first washer-fastener aperture, a second portion defining a second washer-fastener aperture, and a third portion defining a third washer-fastener aperture, and the second surface extends between the first portion, the second portion, and the third portion.

In addition to one or more of the features described above, or as an alternative, further embodiments may include that the first washer-fastener aperture, the second washer-fastener aperture, and the third washer-fastener aperture are linearly arranged.

In addition to one or more of the features described above, or as an alternative, further embodiments may include that the first washer-fastener aperture, the second washer-fastener aperture, and the third washer-fastener aperture are configured in a triangular configuration.

In addition to one or more of the features described above, or as an alternative, further embodiments may include that the pin-securing washer is a first pin-securing washer that is secured on a first side of the assembly pin, the method further comprising securing the assembly pin on a second side of the assembly pin with a second pin-securing washer.

According to another embodiment, a pin-securing washer configured to secure an assembly pin within an assembly is provided. The pin-securing washer includes a first surface defining three fastener apertures, the first surface configured to distribute a load of a fastener that passes through the each of the fastener apertures and a second surface configured to secure an assembly pin that is arranged below the second surface. The first surface includes a first portion defining a first fastener aperture, a second portion defining a second fastener aperture, and a third portion defining a third fastener aperture. The second surface extends between the first portion, the second portion, and the third portion. The first fastener aperture, the second fastener aperture, and the third fastener aperture are configured in a triangular configuration.

Technical effects of embodiments of the present disclosure include providing a washer configured to both support one or more fasteners and to secure an assembly pin within a structure.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
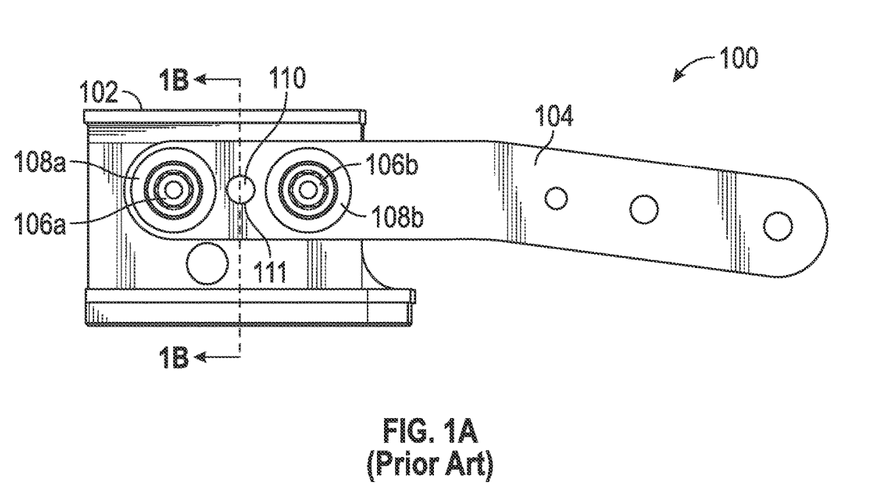
FIG. 1A is a front view of a schematic of a traditional connection that employs an assembly pin.
Figure 1B:
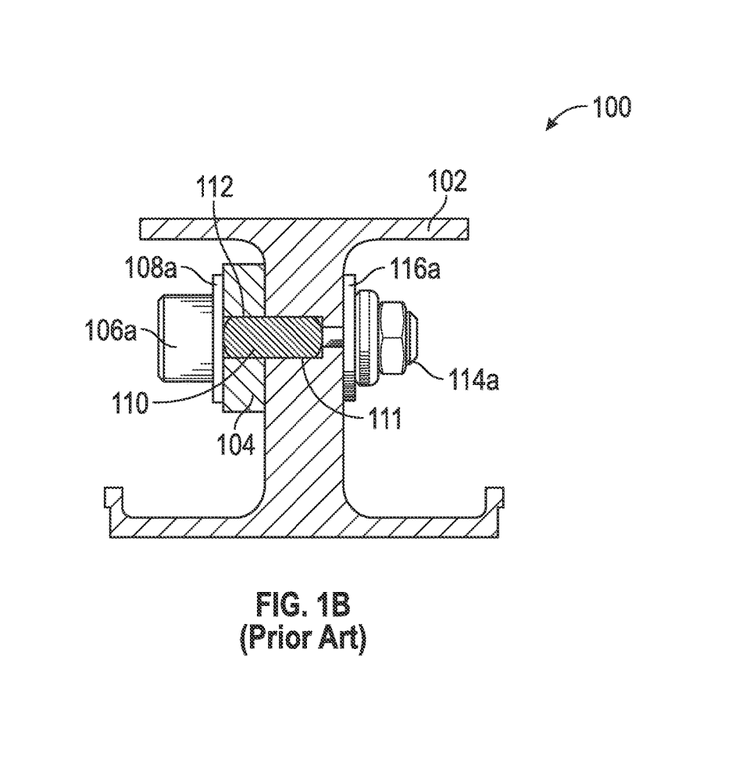
FIG. 1B is a cross-section schematic of the connection of FIG. 1A as viewed along the line A-A shown in FIG. 1A.

FIG. 1A is a front view of a schematic of a traditional connection that employs an assembly pin. FIG. 1B is a cross-sectional view of the connection shown in FIG. 1A along the line A-A. Assembly 100 includes a first structure 102, such as an I-beam, and a second structure 104, such as a connecting plate or link, connected or attached to the first structure 102. The second structure 104 may be configured to enable connection between the first structure 102 and another I-beam (not shown) or connection between the first structure 102 and another component or structure. The second structure 104 is retained, secured, or attached to the first structure 102 by a first fastener 106a, a second fastener 106b, and an assembly pin 110.

The fasteners 106a, 106b are configured to pass through apertures in the second structure 104 and apertures in the first structure 102 to join the two elements together. A first washer 108a is positioned between a head of the first fastener 106a and a surface of the second structure 104, and a second washer 108b is position between a second fastener 106b and a surface of the second structure 104. On a reverse side of the first structure 102, the fasteners 106a, 106b may each be locked or secured by a locking element. For example, as shown in FIG. 1B, the first fastener 106a is locked by a locking element 114a. Additionally, the locking element 114a may be supported by a washer 116a that may be positioned between the locking element 114a and a surface of the first structure 102. It will be appreciated that the second fastener 106b will also be locked by a locking element and a washer, although these elements are not shown.

The assembly 100 may be used to secure the first structure 102 to another structure or component. Shear forces may be imposed on the first structure 102 by the connection. To prevent the fasteners 106a, 106b from breaking under the shear forces, the assembly pin 110 is provided. The assembly pin 110 is configured to bear the shear forces on the assembly 100 during use and thus prevent the fasteners 106a, 106b from breaking.

As shown, the assembly pin 110 is configured to pass through or partially into a first pin aperture 111 in the first structure 102 and through a second pin aperture 112 in the second structure 104. The assembly pin 110 may be held within the pin apertures 111, 112 by press-fit, friction, staking, lock pins, cotter pins, friction rings, clips, lock washers, or other retention means and/or methods. These methods of securing the assembly pin 110 may either be insufficient, such as with press-fit, friction, etc., and the assembly pin 110 may work out of the pin apertures 111, 112 or may require additional materials or components, such as with lock pins, cotter pins, etc. As such, the assembly pin 110 may dislodge from the first structure 102 and/or the second structure 104 and/or the cost and assembly time and complexity may be increased.

Figure 2A:
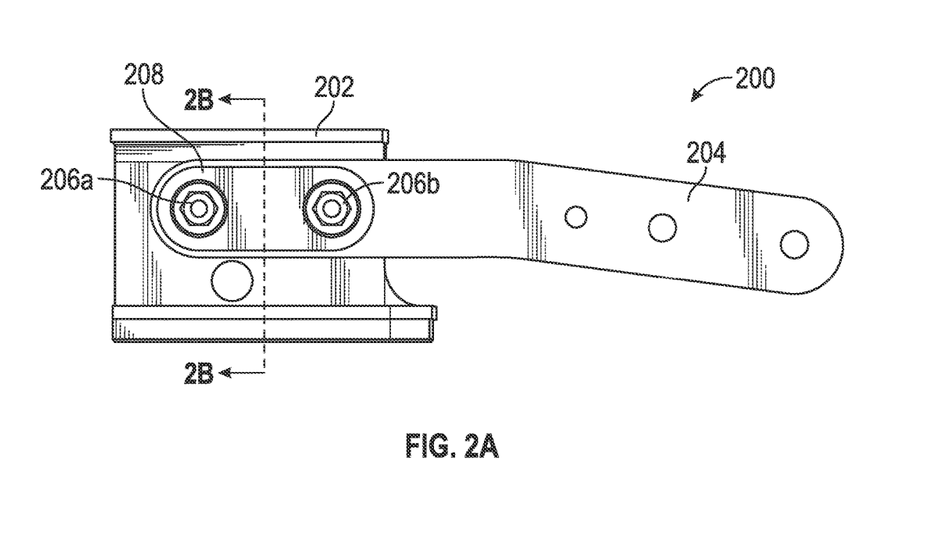
FIG. 2A is a front view of a schematic of a connection including a washer in accordance with an embodiment of the present disclosure.
Figure 2B:
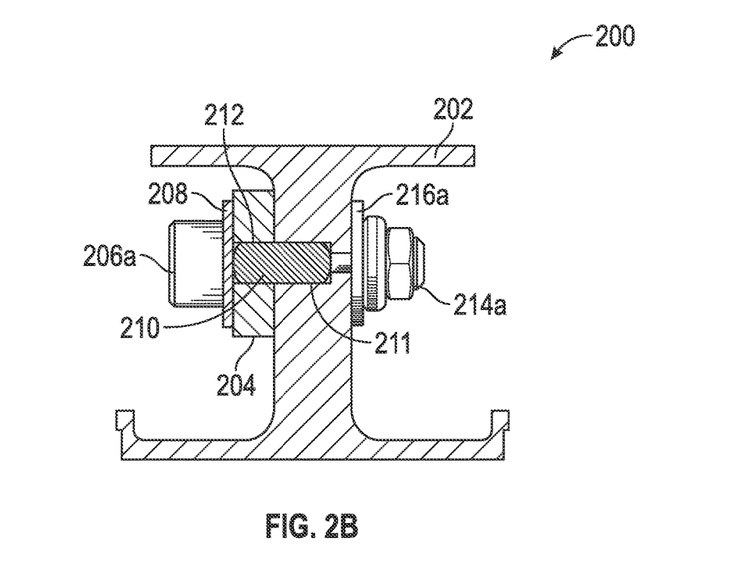
FIG. 2B is a cross-section schematic of the connection of FIG. 2A as viewed along the line A-A shown in FIG. 2A.
Figure 2C:
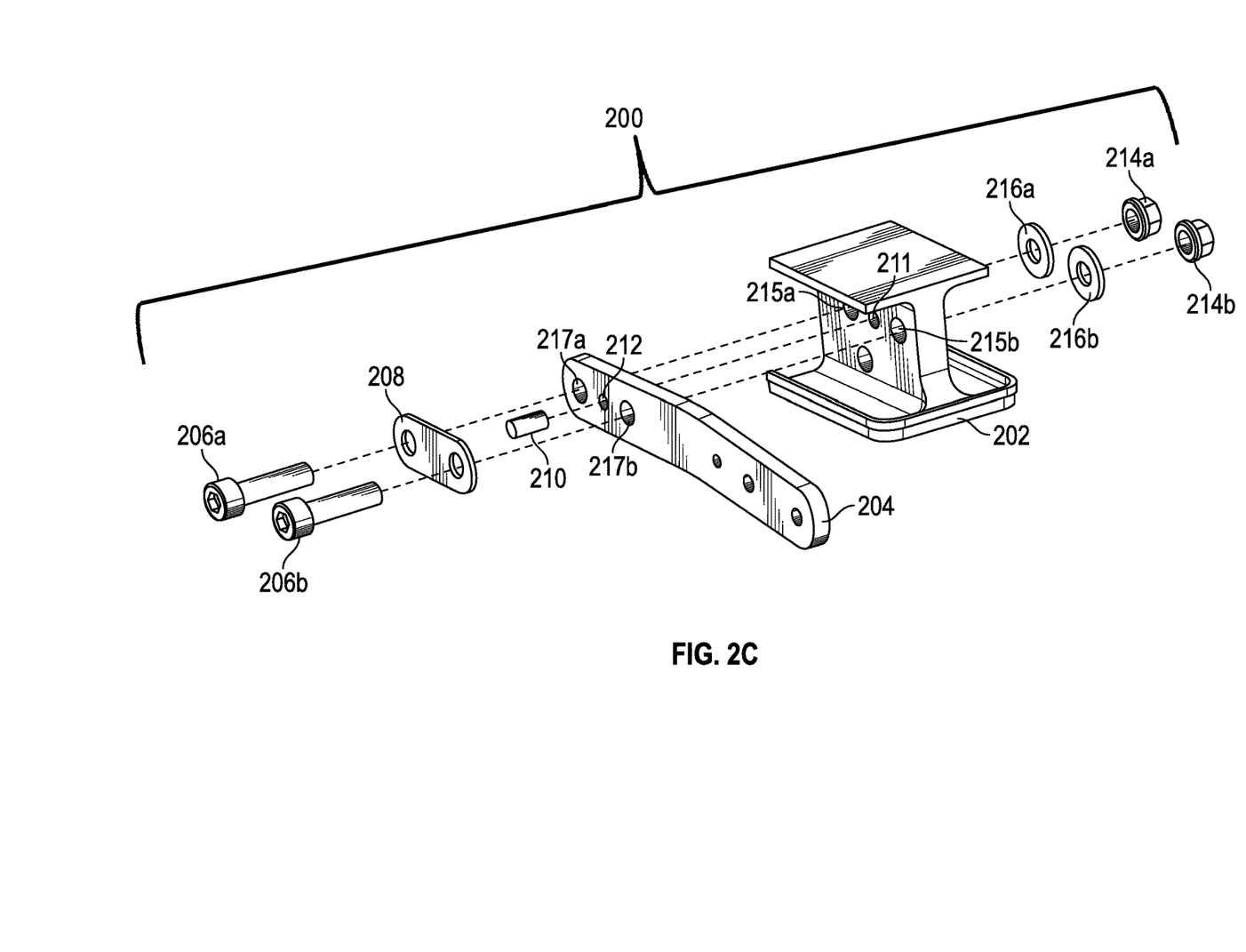
FIG. 2C is an exploded view of the components of the connection shown in FIG. 2A.

Turning now to FIGS. 2A-2C, various schematic views of an assembly including a pin-securing washer in accordance with an embodiment of the present disclosure are shown. FIG. 2A is a side view of a schematic of a connection that employs a pin-securing washer in accordance with an embodiment of the disclosure. FIG. 2B is a cross-sectional view of the connection shown in FIG. 2A along the line A-A. FIG. 2C is an exploded schematic view of the assembly of FIG. 2A.

Assembly 200 includes a first structure 202, such as an I-beam, and a connecting plate or second structure 204 connected to the first structure 202. The second structure 204 may be configured to enable connection between the first structure 202 and another I-beam (not shown) or connection between the first structure 202 and another component or structure. The second structure 204 is retained, secured, or attached to the first structure 202 by a first fastener 206a, a second fastener 206b, and an assembly pin 210.

The fasteners 206a, 206b are configured to pass through first fastener apertures 215a, 215b in the first structure 202 and through second fastener apertures 217a, 217b in the second structure 204, respectively, to join the two elements together. A pin-securing washer 208 is positioned between the head of the fasteners 206a, 206b and a surface of the second structure 204. On a reverse side of the first structure 202, the fasteners 206a, 206b may be locked or secured by locking elements 214a, 214b, respectively. Washers 216a, 216b may be positioned between the locking elements 214a, 214b and a surface of the first structure 202. The pin-securing washer 208 and the washers 216a, 216b are configured to distribute a load of the fasteners 206a, 206b so that damage may not occur to the first structure 202 and/or the second structure 204 when fastened together.

The assembly 200 may be used to secure the first structure 202 to another structure or component. Shear forces may be imposed on the first structure 202 by the connection. To prevent the fasteners 206a, 206b from breaking under the shear forces, the assembly pin 210 is provided. The assembly pin 210 is configured to bear the shear forces on the assembly 200 during use and thus prevent the fasteners 206a, 206b from breaking.

As shown in FIGS. 2B and 2C, the assembly pin 210 is configured to pass through a first pin aperture 211 in the first structure 202 and through (or into) a second pin aperture 212 in the second structure 204. While shown as passing only partway into the first structure 202, it shall be understood that the assembly pin 210 may pass any distance into the first structure 202 and may pass all the way through the first structure in one embodiment. In such an embodiment, the washers 216a, 216b may be replaced with a second pin securing washer similar to pin securing washer 208. The assembly pin 210 may be held within the pin apertures 211, 212 by press-fit and/or friction in a particular embodiment. As shown in FIGS. 2A and 2C, to provide additional securing or retention of the assembly pin 210 in the pin apertures 211, 212, the pin-securing washer 208 has a different construction than the washers 108a, 108b shown in the embodiment of FIG. 1. The pin-securing washer 208 is configured to provide an additional means of retaining or holding the assembly pin 210 within the pin apertures 211, 212.

The configuration takes advantage of the fact that the assembly pin 210 is located proximate to a plurality of fasteners 206a, 206b that pass through the second structure 204 and the first structure 202. The pin-securing washer 208, as shown in the embodiment of FIG. 2A, is configured to replace two adjacent and separate washers (washers 108a, 108b in FIG. 1). The pin-securing washer 208 is configured to straddle or cover the pin apertures 211, 212 and thus secure the assembly pin 210 therein. In doing so, the pin-securing washer 208 traps the assembly pin 210 in the assembly 200 while also acting as a washer for the fasteners 206a, 206b. The pin-securing washer 208 thus prevents the assembly pin 210 from working out of the pin apertures 211, 212. Thus, the pin-securing washer 208 is configured to serve two purposes: (i) distribute a load imposed by a head of a fastener, and (ii) provide additional means of securing an assembly pin within an assembly.

In some embodiments, the first pin aperture 211 may pass entirely through the first structure 202, and thus the assembly pin 210 may be exposed on both sides of the first structure 202. In such embodiments, the washers 216a, 216b may be replaced with a pin-securing washer that is substantially similar to pin-securing washer 208. Thus, in some embodiments, the assembly may include two pin-securing washers.

Advantageously, in some embodiments, the pin-securing washer 208 shown in FIG. 2A may provide a redundant mechanism for securing or retaining an assembly pin 210 in the pin apertures 211, 212. That is, the assembly pin 210 may be retained within the pin apertures 211, 212 by press-fit or friction and is additionally secured by the pin-securing washer 208. Although shown in a single configuration, those of skill in the art will appreciate that other configurations of the pin-securing washer may be employed without departing from the scope of the invention.

Figure 3A:
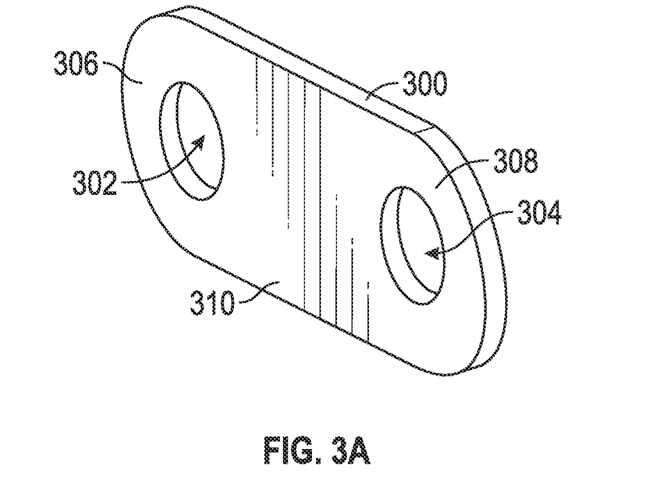
FIG. 3A is an isometric view of a washer in accordance with a first embodiment of the present disclosure.
Figure 3B:
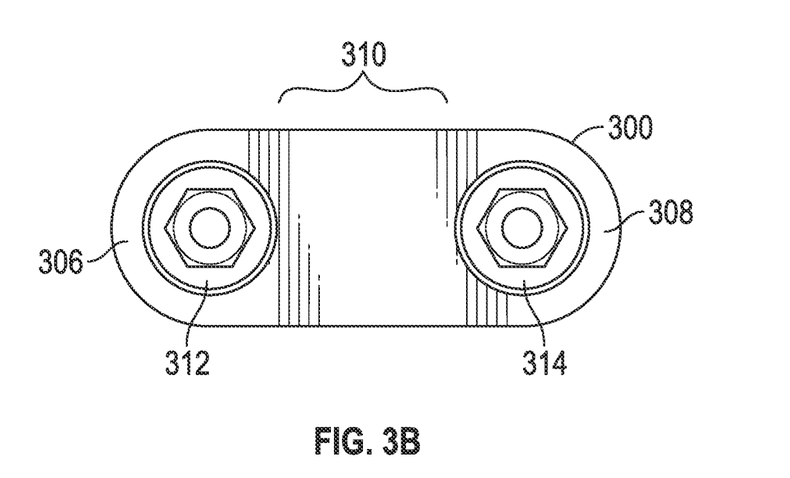
FIG. 3B is a front view of the washer of FIG. 3A with fasteners installed therein.

Turning now to FIGS. 3A and 3B, independent views of a pin-securing washer in accordance with a first example is shown. FIG. 3A shows an isometric view of a pin-securing washer in accordance with the first example, and FIG. 3B shows a front view of the pin-securing washer of FIG. 3A with fasteners passing therethrough.

A pin-securing washer 300 in accordance with the first example defines a first fastener aperture 302 and a second fastener aperture 304. Surrounding and defining the fastener apertures 302, 304 is a first surface 306, 308, wherein a first fastener surface 306 surrounds and defines the first fastener aperture 302 and surrounding and defining the second fastener aperture 304 is a second fastener surface 308. The first surface 306, 308 is configured to distribute a load imposed by a first fastener 312 and a second fastener 314, respectively.

Extending between the surfaces of the first surface, i.e., the first fastener surface 306 and the second fastener surface 308, is a second surface 310. The second surface 310 may be a pin-securing surface. The second surface 310 is configured to secure a pin, such as an assembly pin, that is located beneath the second surface 310. It will be appreciated that the pin-securing washer 300 is reversible and the surfaces on both sides are the same. Further, it will be appreciated that the fastener surfaces, e.g., fasteners surfaces 306, 308, are on an opposite side of the pin-securing washer 300 from the second surface 310. That is, the pin-securing surface is on the opposite side of the pin-securing washer from the fastener surfaces. For example, as shown in FIGS. 2A-2C, a portion of the pin-securing washer 208 covers the assembly pin 210 and retains or secures the assembly pin 210 within the pin apertures 211, 212.

As noted above, the pin-securing washer described herein is not limited to the geometry and configuration shown and described above. For example, in the embodiments shown in FIGS. 4A-4D, alternative configurations of pin-securing washers in accordance with various embodiments of the disclosure are shown.

Figure 4A:
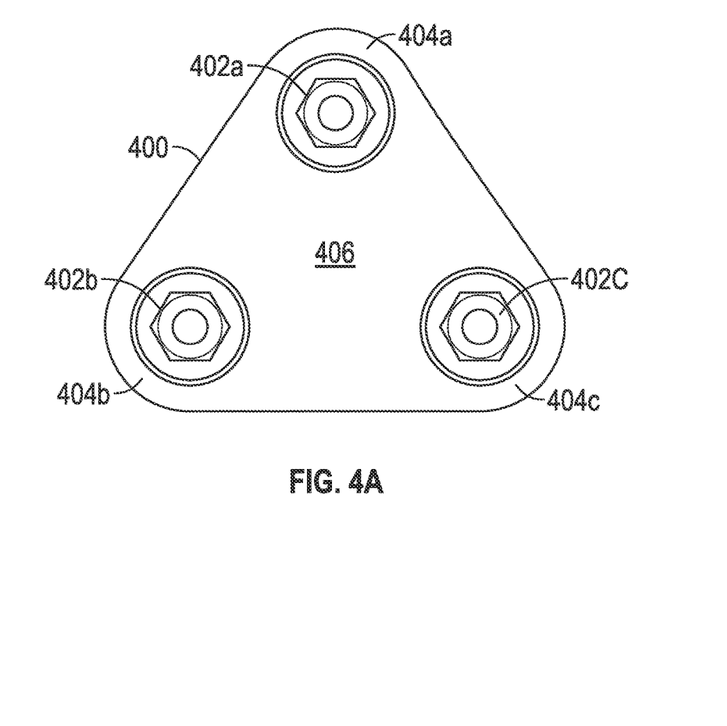
FIG. 4A is a schematic view of a washer in accordance with a second embodiment of the present disclosure.

In FIG. 4A, a triangular pin-securing washer in accordance with a second embodiment is configured to provide load distribution for three fasteners. As shown, the pin-securing washer 400 spans or covers a space surrounding and between three fasteners 402a, 402b, 402c that form a triangular configuration. Thus, the pin-securing washer 400 is configured in a triangular shape to be able to provide load distribution to all three fasteners 402a, 402b, 402c. As such, the pin-securing washer 400 includes first surfaces 404a, 404b, 404c that surround and support the fasteners 402a, 402b, 402c, respectively. The pin-securing washer 400 also includes a second surface 406 configured to secure a pin. The surface of the pin-securing washer 400 that is between the three fasteners 402a, 402b, 402c may be configured to secure an assembly pin, as described above. In some embodiments, the central portion of the second surface 406 of the pin-securing washer 400 may secure a single assembly pin. In other embodiments, the portions of the second surface 406 between the fasteners 402a, 402b, 402c, along the triangular shape, may be configured to secure one or more pins, similar to that shown in FIGS. 2A-2C.

Figure 4B:
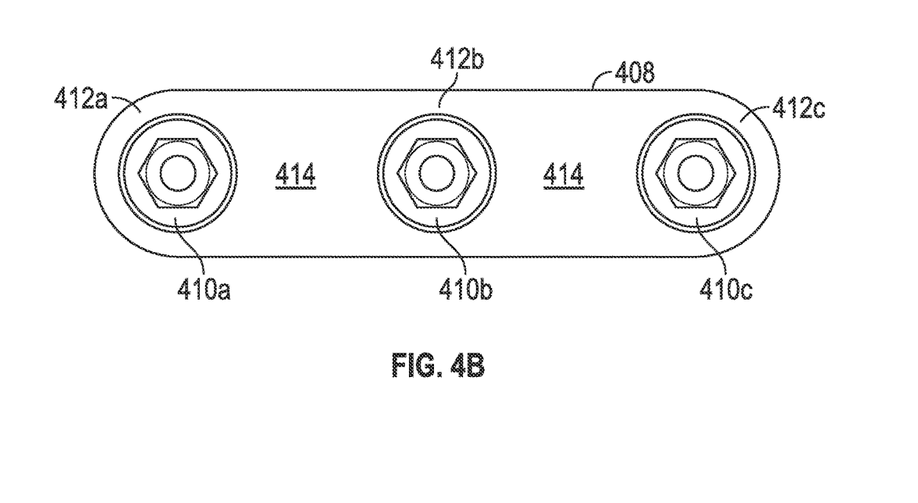
FIG. 4B is a schematic view of a washer in accordance with a third embodiment of the present disclosure.

In FIG. 4B, a linear pin-securing washer in accordance with a third embodiment is configured to provide load distribution for three fasteners. As shown the pin-securing washer 408 spans and supports three fasteners 410a, 410b, 410c that are linearly arranged. Each fastener 410a, 410b, 410c is surrounded by a first surface 412a, 412b, 412c. In this embodiment, the pin-securing washer 408 may be configured to secure a single assembly pin that is located between two of the three fasteners 410a, 410b, 410c with a portion of a second surface 414 or may be configured to secure two assembly pins, with the assembly pins located between two adjacent fasteners 410a, 410b, 410c.

Figure 4C:
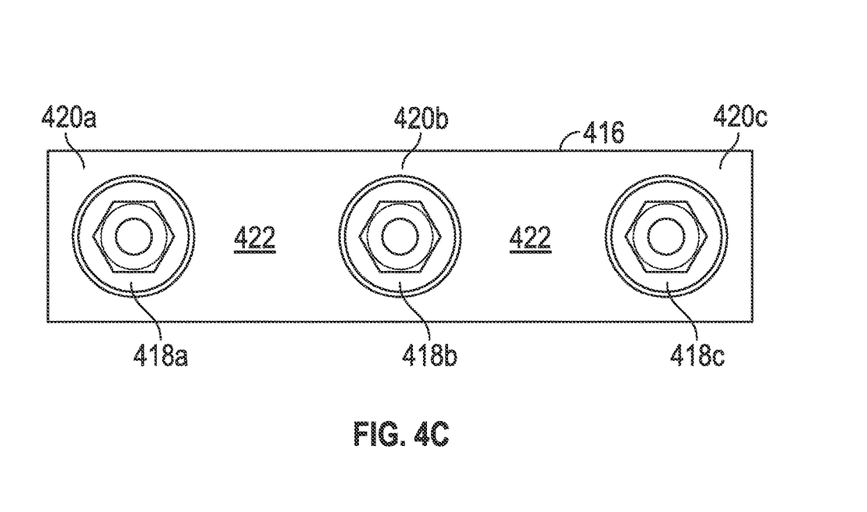
FIG. 4C is a schematic view of a washer in accordance with a fourth embodiment of the present disclosure.

In FIG. 4C, a pin-securing washer 416 similar to the embodiment shown in FIG. 4B is shown, with three linearly arranged fasteners 418a, 418b, 418c. However, in this embodiment, the corners of the pin-securing washer 416 are squared, rather than curved. The three fasteners 418a, 418b, 418c are surrounded by first surfaces 420a, 420b, 420c of the pin-securing washer and second surfaces 422 extend therebetween. The shape of the pin-securing washer, in accordance with the disclosure, may be configured based on the needs and requirements of the use, and thus this example embodiment is provided to show the variations possible.

Figure 4D:
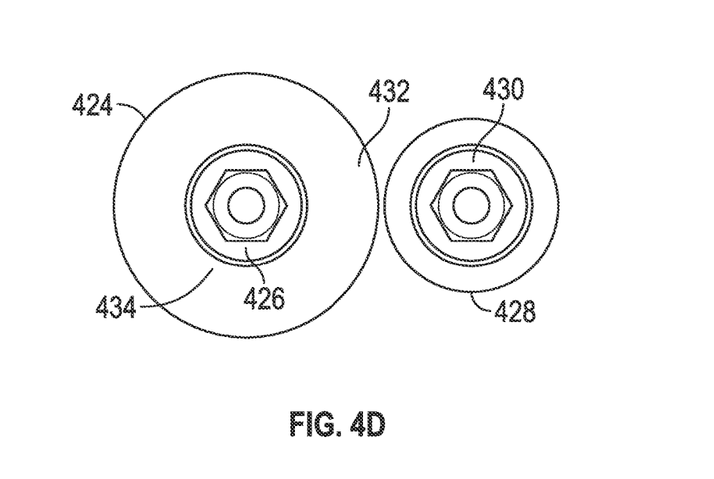
FIG. 4D is a schematic view of a washer in accordance with a fifth embodiment of the present disclosure.

Finally, in FIG. 4D, an alternative embodiment is shown. In FIG. 4D, the pin-securing washer 424 may be configured to provide load support for a single fastener 426 but have a larger diameter than a traditional washer, such as washer 428 which supports fastener 430. In this configuration, an outer diameter surface of the pin-securing washer 424 is configured as a second surface 432 for securing a pin and an inner diameter surface of the pin-securing washer 424 is configured as a first surface 434 for supporting the fastener 426.

Advantageously, embodiments described herein provide a pin-securing washer that eliminates the need for a secondary operation or mechanism, such as installing a cotter pin or staking, to secure an assembly pin within an assembly. Further, advantageously, pin-securing washers in accordance with embodiments disclosed herein enable a reduction in part counts, e.g., two or more washers may be replaced with a single pin-securing washer. Furthermore, washers disclosed herein may simplify assembly processes by reducing the number of components and/or parts, and also there may be a reduction in labor time. For example, the total cost is less by eliminating the number of parts and by reducing the amount of labor to secure the assembly pins. Moreover, embodiments disclosed herein may reduce overall product cost by reducing the number of component parts needed, e.g., reduce the number of washers and/or reduce additional components necessary to secure an assembly pin in the assembly.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although certain embodiments of a pin-securing washer in accordance with the disclosure are shown and described herein, those of skill in the art will appreciate that the geometry, shapes, dimensions, and configurations of the pin-securing washer may be varied without departing from the scope of the invention. Furthermore, although a single structure (I-beam) is shown, those of skill in the art will appreciate that other structures may be used without departing from the scope of the disclosure. That is, pin-securing washers as disclosed herein may be employed with any structure that uses an assembly pin wherein it is desired to provide a securing mechanism to retain or secure the assembly pin within the assembly. This is particularly true when the assembly pin is to be located or positioned adjacent to two or more fasteners.

Furthermore, as noted above, the number of fasteners is not limited to two or three, but rather, pin-securing washers in accordance with embodiments of the disclosure may be used for any number of fasteners. Additionally, although a single structure is shown for the link in FIGS. 1 and 2, those of skill in the art will appreciate that the link may be any type of connector, bracket, link, or other connecting structure, and the embodiments shown and described are merely provided for illustrative and explanatory purposes.

Furthermore, although described herein with respect to shear forces and the assembly pin being a shear pin, those of skill in the art will appreciate that the pin-securing washers may be used with any trapped or secured assembly pin. For example, pin-securing washers as described herein may be used for pins that are employed for linkages and/or for pins that operate as pivot points or other trapped pins.

Accordingly, the present disclosure is not to be seen as limited by the foregoing description, but is only limited by the scope of the appended claims.

What is claimed is:

1. An assembly comprising:
   a first structure having a first pin aperture and at least one first fastener aperture adjacent the first pin aperture;
   a second structure having a second pin aperture and at least one second fastener aperture adjacent the second pin aperture, the second structure configured to be attached to the first structure with the first pin aperture aligned with the second pin aperture and the first fastener aperture aligned with the second fastener aperture;

at least one fastener configured to pass through the first and second fastener apertures and attach the first structure to the second structure;

an assembly pin configured to pass through the first and second pin apertures, the assembly pin configured to be trapped within the first and second pin apertures such that the assembly pin is configured to bear a shear load; and a pin-securing washer having a first surface defining at least one pin-securing washer fastener aperture, the first surface configured to distribute a load of a fastener that passes through the at least one pin-securing washer fastener aperture and a second surface configured to secure the assembly pin within the first and second pin apertures, wherein the at least one fastener passes through the at least one pin-securing washer fastener aperture, wherein the pin-securing washer is a first pin-securing washer that is installed on a first side of the assembly pin, the assembly further comprising a second pin-securing washer configured to be installed on a second side of the assembly pin, wherein the assembly pin is separate from each of the first pin-securing washer and the second pin-securing washer, and the first and second pin-securing washers are arranged to contact and secure the assembly pin within the first and second pin apertures.

2. The assembly of claim 1, wherein the first structure is an I-beam and the second structure is a link.

3. The assembly of claim 1, wherein the first surface includes a first portion defining a first pin-securing washer fastener aperture and a second portion defining a second pin-securing washer fastener aperture and the second surface extends between the first portion and the second portion.

4. The assembly of claim 3, wherein the at least one fastener includes a first fastener configured to pass through the first pin-securing washer fastener aperture and a second fastener configured to pass through the second pin-securing washer fastener aperture.

5. The assembly of claim 1, wherein the first surface includes a first portion defining a first pin-securing washer fastener aperture, a second portion defining a second pin-securing washer fastener aperture, and a third portion defining a third pin-securing washer fastener aperture, and the second surface extends between the first portion, the second portion, and the third portion.

6. The assembly of claim 5, wherein the first pin-securing washer fastener aperture, the second pin-securing washer fastener aperture, and the third pin-securing washer fastener aperture are linearly arranged.

7. A method of securing a first structure to a second structure, the method comprising:

providing a first structure having a first pin aperture and at least one first fastener aperture adjacent the first pin aperture;

providing a second structure having a second pin aperture and at least one second fastener aperture adjacent the second pin aperture, the second structure configured to be attached to the first structure with the first pin aperture aligned with the second pin aperture and the first fastener aperture aligned with the second fastener aperture;

inserting an assembly pin through the first and second pin apertures, the assembly pin configured to be trapped within the first and second pin apertures such that the assembly pin is configured to bear a shear load;

providing at least one fastener configured to pass through the first and second fastener apertures and attach the first structure to the second structure; and securing the assembly pin in the first and second pin apertures with a pin-securing washer, the pin-securing washer having a first surface defining at least one pin-securing washer-fastener aperture through which the at least one fastener passes, the first surface configured to distribute a load of the at least one fastener, and a second surface configured to secure the assembly pin within the first and second pin apertures, wherein the pin-securing washer is a first pin-securing washer that is secured on a first side of the assembly pin, the method further comprising securing the assembly pin on a second side of the assembly pin with a second pin-securing washer, wherein the assembly pin is separate from each of the first pin-securing washer and the second pin-securing washer, and the first and second pin-securing washers are arranged to contact and secure the assembly pin within the first and second pin apertures.

8. The method of claim 7, wherein the first structure is an I-beam and the second structure is a link.

9. The method of claim 7, wherein the first surface includes a first portion defining a first pin-securing washer-fastener aperture in the pin-securing washer and a second portion defining a second pin-securing washer-fastener aperture in the pin-securing washer and the second surface extends between the first portion and the second portion to secure the assembly pin in the first and second pin apertures.

10. The method of claim 9, wherein the at least one fastener includes a first fastener configured to pass through the first pin-securing washer-fastener aperture and a second fastener configured to pass through the second pin-securing washer-fastener aperture.

11. The method of claim 7, wherein the first surface includes a first portion defining a first pin-securing washer-fastener aperture, a second portion defining a second pin-securing washer-fastener aperture, and a third portion defining a third pin-securing washer-fastener aperture, and the second surface extends between the first portion, the second portion, and the third portion.

12. The method of claim 11, wherein the first pin-securing washer-fastener aperture, the second pin-securing washer-fastener aperture, and the third pin-securing washer-fastener aperture are linearly arranged.

* * * * *